United States Patent [19]

Herzner

[11] 3,859,603

[45] Jan. 7, 1975

[54] TRIANGULAR GENERATOR

[75] Inventor: Karl Heinz Herzner, Hamburg, Germany

[73] Assignee: U.S. Philips Corporation, New York, N.Y.

[22] Filed: June 27, 1973

[21] Appl. No.: 373,946

[30] Foreign Application Priority Data

Oct. 6, 1972 Germany ............................ 2249082

[52] U.S. Cl. .................. 328/181, 307/228, 328/160

[51] Int. Cl. ........................................... H03k 17/00

[58] Field of Search .................... 328/160, 127, 181; 307/228, 293

[56] References Cited

UNITED STATES PATENTS

| | | | |
|---|---|---|---|
| 2,748,272 | 5/1956 | Schrock | 328/127 X |
| 3,440,448 | 4/1969 | Dudley | 328/127 X |
| 3,714,470 | 1/1973 | Goldberg | 328/127 X |

*Primary Examiner*—Rudolph V. Rolinec
*Assistant Examiner*—B. P. Davis
*Attorney, Agent, or Firm*—Frank R. Trifari; Bernard Franzblau

[57] ABSTRACT

A triangular voltage is generated by charging and discharging a capacitor by means of a switchable current generator. The output current of the current generator is detrmined proportionally by a voltage on a control input. A threshold switch, which is activated each time that the output voltage exceeds either of two threshold voltages, controls a change-over device before the control input of the current generator, which each time connects this control input to either of two control voltages, which cause opposite currents at the output of the current generator. In order to enable the duty cycle of the triangular voltage to be varied without affecting its frequency, one control voltage is produced by a dividing circuit whose divided input is connected to a multiplier circuit whose inputs receive the other control voltage as well as an auxiliary voltage, and whose divisor input is connected to a differential amplifier which produces the difference between these two voltages. In addition, in order to enable the frequency to be changed independently of the duty cycle, the other control voltage is also produced by a second multiplier circuit. Moreover, if the amplitude of the triangular voltage is to be changed without affecting the frequency, the auxiliary voltage is generated by a third multiplier circuit. In this way, the three parameters can be adjusted independently of each other.

10 Claims, 5 Drawing Figures

TRIANGULAR GENERATOR

Figure 1:
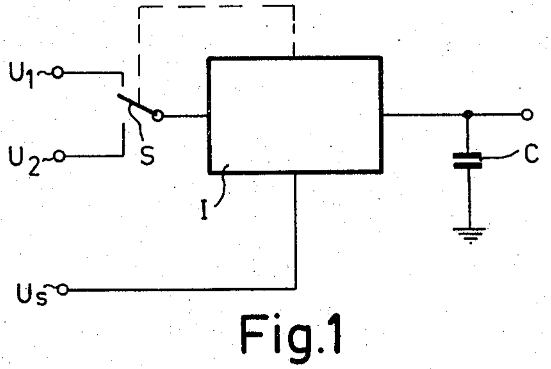

The invention relates to a circuit arrangement for generating a controllable triangular voltage by means of a voltage-controlled current generator, whose output feeds a current which is proportional to a voltage appearing on a control input into a capacitor, across which the triangular-voltage is available, and the control input of which is alternately connected to either of two control voltages via a change-over device, which control voltages bring on opposite currents at the output of the current generator, the change-over device being switched over each time that the output voltage exceeds a voltage range defined by two voltage thresholds.

The generation of triangular-voltages by charging and discharging a capacitor with constant currents is known per se. U.S. Pat. No. 3,440,448 discloses a current generator apparatus consisting of two current sources with currents of opposite direction. The current source supplying a greater current is switched on and off respectively by a comparator when said comparator has established that the output voltage appearing on the capacitor exceeds a given voltage range. The currents of the two current sources can jointly be controlled by one input voltage, thus enabling the frequency of the triangular voltage to be varied. However, a voltage-controlled variation of the duty cycle of the triangular-voltage cannot be achieved by said apparatus, nor is this intended.

A further circuit arrangement for generating a triangular voltage is disclosed in DAS 1,921,035, in which a capacitor is also alternately charged and discharged by a current generator and in which the current generator also comprises two current sources supplying currents of opposite direction, one of the current sources being switched on and off respectively by a threshold switch when the voltage across the capacitor reaches preset threshold voltages. In this case the two current sources can be controlled independently of each other so that the slope of the rising and the falling edge of the output voltage and thus the duty cycle can be adjusted. However, as a result of this the repetition frequency of the triangular voltage cycle is generally changed at the same time.

It is an object of the invention to provide a circuit arrangement by means of which the duty cycle of the triangular voltage can be changed without affecting the repetition frequency. On the basis of the circuit arrangement mentioned in the introduction, the invention provides a solution to this problem in that the first control voltage for the current generator is also applied to one input of a first multiplier circuit and to the non-inverting input of a differential amplifier, that a first auxiliary voltage is applied to the other input of the first multiplier circuit and to the inverting input of the differential amplifier, that the output of the first multiplier circuit is connected to the dividend input and the output of the differential amplifier to the divisor input of a first dividing circuit, whose output supplies the second control voltage for the current generator. Due to this arrangement the first control voltage defines the duty cycle of the triangular voltage without affecting the repetition frequency, enabling the duty cycle to be changed directly by changing one control voltage only, without influencing the frequency. The duty cycle and the first control voltage are inversely proportional.

The frequency of the triangular voltage can be adjusted by varying the first auxiliary voltage, but in that case the duty cycle of the triangular voltage changes as well. In order to avoid this, the first control voltage is generated by a second multiplier circuit, to one input of which the first auxiliary voltage is applied and whose other input is connected to the output of a second dividing circuit. To the dividend input of the second dividing circuit a second auxiliary voltage is applied and to the divisor input of which a duty-cycle control voltage is applied enabling directly proportional adjustment of the duty cycle. Furthermore, the frequency of the triangular voltage is directly proportional to the first auxiliary voltage, but no longer affects the duty cycle. Thus, the duty cycle and the frequency of the triangular voltage can be adjusted independently of each other by one voltage each.

The amplitude of the triangular voltage is determined by the spacing of the two voltage threshold, i.e. by the voltage range between them. When the amplitude of the triangular voltage is increased, for example, by increasing the voltage range, the frequency of the triangular voltage decreases because if the slope of the rising and falling edges remains constant, the total duration and thus the period of the triangular voltage is increased. In a further embodiment of the invention, in order to avoid this, the first auxilary voltage is produced at the output of a third multiplier circuit, to one input of which a frequency control voltage is applied and to whose other input a threshold control voltage is applied which determines the spacing between the voltage thresholds. This enables both the frequency and the amplitude as well as the duty cycle of the triangular voltage to be adjusted independently of each other.

Figure 2:
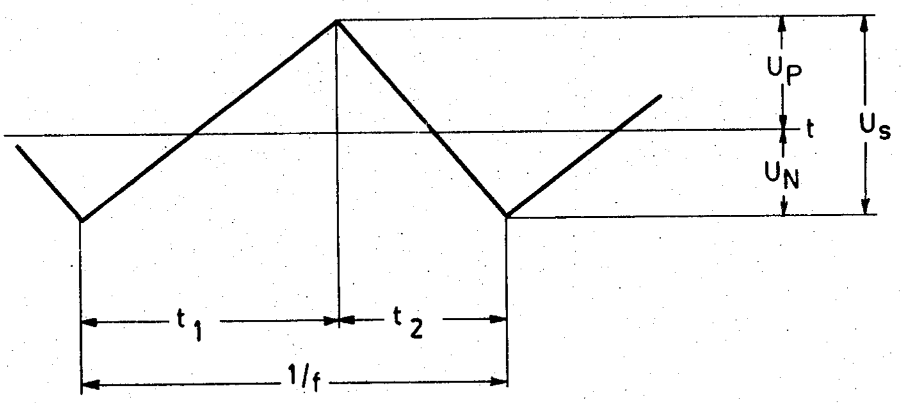
Figure 3:
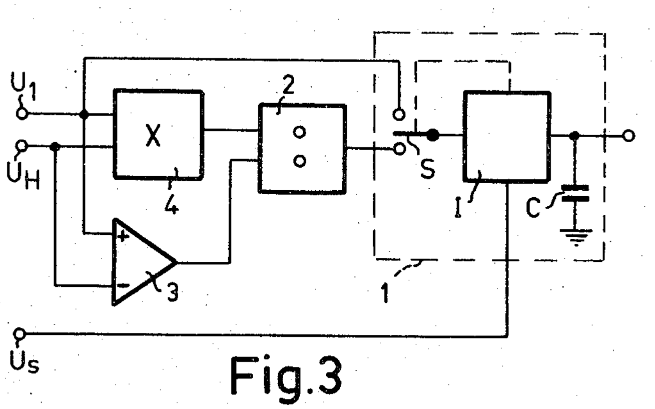
Figure 4:
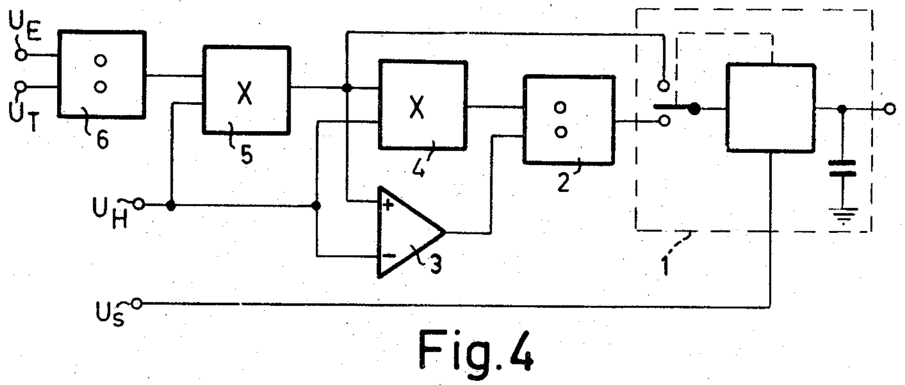
Figure 5:
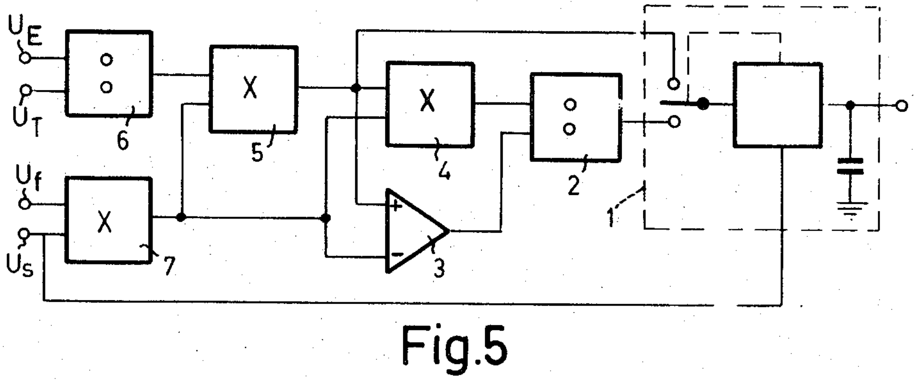

Embodiments of the invention will be described, by way of example, with reference to the following drawings. In these drawings:

FIG. 1 is a block diagram of a circuit for generating a triangular voltage by means of a capacitor and a switchable current generator, FIG. 2 shows the voltage across the capacitor as a function of time, FIG. 3 is a block diagram of a circuit arrangement according to the invention for changing the duty cycle, FIG. 4 is a block diagram of a more elaborate circuit arrangement according to FIG. 3, and FIG. 5 is a block diagram of a more elaborate circuit arrangement according to FIG. 4.

FIG. 1 shows the basic circuit arrangement for generating a triangular voltage. The current generator I produces an output current which is proportional to a voltage at its control input. In the drawn position of the change-over device S, this is the control voltage $U_1$. The current charges a capacitor C across which a voltage appears which increases as a linear function of time. When this voltage reaches an upper threshold level, a threshold switch incorporated in device I switches over the changeover device S so that that control voltage $U_2$ now appears at the control input of the current generator I. This control voltage has a value such that it causes a current to flow in the opposite direction at the output of the current generator I, which discharges the capacitor C so that across the capacitor a voltage is produced which decreases as a linear function of time. When this voltage attains a lower threshold value, the threshold switch resets the change-over device S so that at the control input of the current generator I the control voltage $U_1$ re-appears, which charges the capacitor positively again. A control voltage $U_S$ determines the spacing between the voltage thresholds by controlling the voltage levels at which the threshold switch in the current generator I changes over. Hence the amplitude of the triangular voltage can be adjusted. The design of the current generator with the threshold switch included in it will not be further described because such circuit arrangements are known and are not a part of the invention. For example, U.S. Pat. No. 3,714,470 discloses a similar type of triangular waveform generator.

FIG. 2 shows the waveform of the triangular voltage. The slope of the rising edge is determined by the values of the current and of the capacitor C in FIG. 1. As the value of the capacitor C is constant and the current is proportional to the control voltage $U_1$, the rise time $t_1$ will be inversely proportional to this control voltage in the case of a fixed voltage threshold. The same applies to the decay time $t_2$, which is inversely proportional to the control voltage $U_2$. The sum of the rise and the decay times is the period or the inverse of the frequency $f$ of the triangular voltage.

It is evident from FIG. 2 that a variation of the duty cycle T by changing the rise time $t_1$ or the decay time $t_2$ directly, results in a change of the period and thus of the frequency of the triangular voltage. The duty cycle T is defined herein as follows.

$$T=\frac{t_1}{t_1+t_2}\approx\frac{\frac{1}{U_1}}{\frac{1}{U_1}+\frac{1}{U_2}}$$

Moreover, it is evident from FIG. 2 that a variation of the voltage range $U_S$ between the threshold voltages $U_P$ and $U_N$ at which the threshold switch in the current generator I in FIG. 1 is activated, also causes the frequency of the triangular voltage to change because the slope of the edges remains constant so that the rise time and the decay time change in the same ratio.

FIG. 3 shows an embodiment of the invention in which the duty cycle of the triangular voltage can be changed without influencing the frequency by varying only one control voltage. In this Figure the circuit 1 is the circuit arrangement shown in FIG. 1. The first control voltage $U_1$ is directly applied to the changeover device S from an external source, whereas the second control voltage is produced by a dividing circuit 2. The dividend input of this dividing circuit is connected to the output of a multiplier circuit 4, to whose two inputs the first control voltage $U_1$ and the first auxiliary voltage $U_H$ are applied. The divisor input of the dividing circuit 2 is connected to the output of a differential amplifier 3 to whose inverting input the first auxiliary voltage $U_H$ is applied and to whose non-inverting input the first control voltage $U_1$ is applied. In this circuit arrangement, when the first control voltage $U_1$ is varied, the second control voltage, produced at the output of the dividing circuit 2, changes in such a way that only the duty cycle of the generated triangular voltage is changed, without affecting the frequency. According to FIG. 2 the following equation applies to the frequency f of the triangular voltage:

$$f=\frac{1}{t_1+t_2}=\frac{\frac{1}{U_s}}{\frac{1}{U_1}+\frac{1}{U_2}}$$

When in this equation the voltage produced by the circuit arrangement according to FIG. 3 is inserted, it will be found that in the equation for the frequency $f$ the control voltage $U_1$ is eliminated.

The dividing circuit 2 is a circuit arrangement which produces an output voltage whose value equals the value of the voltage applied to the upper input divided by the value of the voltage applied to the lower input, if required with a proportionality factor. The multiplier circuit 4 is a circuit arrangement in which the output voltage value equals the product of the values of the two input voltages, and in which possible constant factor is to be taken into account as well. The differential amplifier 3 is a circuit arrangement in which the value of the output voltage equals the difference of the values of the input voltages. The design of such circuit arrangements is known and is not described in further detail because it is not an essential feature of the invention.

The foregoing will become obvious from the following discussion. The output of multiplier 4 provides a signal equal to $U_1 \cdot U_H$, i.e. the product of its two input signals $U_1$ and $U_H$. At the same time, the differential amplifier 3 provides an output signal equal to $U_1 - U_H$, i.e. the difference of its two input signals $U_1$ and $U_H$. These signals are applied to the inputs of dividing circuit 2 which provides an output signal $U_2$ equal to the quotient thereof, i.e., $U_2 = U_1 \cdot U_H / U_1 - U_H$.

If we substitute the foregoing expression in the above equations for the duty cycle T and the frequency $f$ of the triangular voltage, the following equations result:

$$T=\frac{\frac{1}{U_1}}{\frac{1}{U_1}+\frac{U_1-U_H}{U_1\cdot U_H}}=\frac{\frac{1}{U_1}}{\frac{1}{U_H}}=\frac{U_H}{U_1}$$

$$f=\frac{\frac{1}{U_S}}{\frac{1}{U_1}+\frac{U_1-U_H}{U_1\cdot U_H}}=\frac{\frac{1}{U_S}}{\frac{1}{U_H}}=\frac{U_H}{U_S}$$

From the above equations it is now clear that it is possible to change the frequency $f$ by varying the voltage $U_S$ without affecting the duty cycle T because T is independent of $U_S$. In addition, it is possible to change the duty cycle T by varying the voltage $U_1$ without affecting the frequency $f$ because $f$ is now independent of $U_1$.

In the circuit arrangement according to FIG. 3, the duty cycle T is inversely proportional to the first control voltage $U_1$, and when the frequency $f$ of the generated triangular voltage is changed by varying the first auxiliary voltage $U_H$ the duty cycle T is also influenced. In order to avoid this, a circuit arrangement as shown in FIG. 4 is used. In this circuit arrangement the first control voltage is no longer applied directly from an external source, but is derived from a second multiplier circuit 5, to one input of which the first auxiliary voltage $U_H$ is applied and whose other input is connected to the output of a second dividing circuit 6, to whose dividend input a second auxiliary voltage $U_E$ is applied and to whose divisor input a duty cycle control voltage $U_T$ is applied. In this circuit arrangement the auxiliary voltage $U_H$ is again directly proportional to the frequency $f$ of the generated triangular voltage, but it no longer influences the duty cycle T. Due to the dividing circuit 6 the duty cycle T is now also directly proportional to the duty cycle control voltage $U_T$. The second auxiliary voltage $U_E$, which is to be kept constant, represents a constant factor for the duty-cycle control voltage. This second dividing circuit 6 may be omitted when the duty cycle T is to be inversely proportional to a control voltage.

As already stated, the frequency $f$ of the generated triangluar voltage depends on the amplitude thereof given by the spacing between the two threshold voltages $U_P$ and $U_N$ according to FIG. 2, the spacing being determined by the threshold control voltage $U_S$. In order to avoid this dependency, the circuit arrangement shown in FIG. 5 is used. In this circuit arrangement the first auxiliary voltage is produced by a further multiplier circuit 7 to whose inputs the frequency control voltage $U_f$ and the threshold control voltage $U_S$ are applied. This circuit arrangement is otherwise identical to that shown in FIG. 4.

By means of the circuit arrangement according to FIG. 5, all three of the parameters of the generated triangular voltage can now be adjusted independently of each other by separate control voltages, i.e. the duty cycle T proportionally to the duty-cycle control voltage $U_T$, the frequency $f$ proportionally to the frequency control voltage $U_f$ and the amplitude proportionally to the threshold control voltage $U_S$.

What is claimed is:

1. A circuit arrangement for generating a controllable triangular voltage comprising, a capacitor, a voltage-controlled current generator having an output which feeds a current proportional to a voltage appearing at a control input of said current generator into said capacitor across which the triangular voltage is developed, a switching device for alternately connecting the control input of the current generator to either of two control voltages which cause opposite currents to flow at the output of the current generator, the switching device being switched over each time that the output voltage exceeds a voltage range defined by first and second voltage levels, first means for applying the first control voltage for the current generator to one input of a first multiplier circuit and to the non-inverting input of a differential amplifier, second means for applying a first auxiliary voltage to the other input of the first multiplier circuit and to the inverting input of the differential amplifier, means for connecting the output of the first multiplier circuit to the dividend input and the output of the differential amplifier to the divisor input of a first dividing circuit which derives at its output the second control voltage for the current generator.

2. A circuit arrangement as claimed in claim 1 wherein said first and second voltage applying means comprise a second multiplier circuit and a second dividing circuit wherein the first control voltage is supplied by the output of the second multiplier circuit, one input of which receives the first auxiliary voltage and the other input of which is connected to the output of the second dividing circuit, and means for applying a second auxiliary voltage to the dividend input and a duty cycle control voltage to the divisor input of said second dividing circuit.

3. A circuit arrangement as claimed in claim 2, characterized in that the first auxiliary voltage is supplied by the output of a third multiplier to one input of which a frequency control voltage is applied to the other input of which a threshold control voltage defining the voltage range between the first and second voltage levels is applied.

4. A circuit arrangement as claimed in claim 1, characterized in that the first control voltage controls the duty cycle of the triangular voltage without affecting the repetition frequency.

5. A circuit arrangement as claimed in claim 2, characterized in that the first auxiliary voltage controls the repetition frequency of the triangular voltage without affecting its duty cycle and that the duty cycle control voltage controls the duty cycle of said triangular voltage without affecting the repetition frequency.

6. A circuit arrangement as claimed in claim 3, characterized in that the threshold control voltage controls the amplitude of the triangular voltage without affecting the repetition frequency or the duty cycle and that the frequency control voltage controls the repetition frequency of the triangular voltage without affecting the amplitude or the duty cycle and that the duty-cycle control voltage controls the duty cycle of the triangular voltage without affecting the repetition frequency or the amplitude.

7. Signal generating apparatus comprising, a voltage-controlled triangular waveform voltage generator, first and second terminals for first and second control voltages, respectively, switching means controlled by the triangular voltage generator for alternately coupling the first and second control voltages to a control input of the triangular voltage generator which is responsive thereto to derive respectively positive and negative going linear segments of the triangular voltage waveform, means coupled to said triangular voltage generator for defining a voltage range bounded by first and second voltage threshold levels which define the switching points of said switching means, and circuit means for coupling said first and second terminals to said switching means, said circuit means comprising, a first multiplier circuit, a first dividing circuit, a differential amplifier, means for coupling said first terminal to a first input of the multiplier circuit and to a first input of the differential amplifier, a third terminal for a first auxiliary voltage, means for coupling said third terminal to a second input of the multiplier circuit and to the other input of the differential amplifier, and means for coupling the output of the multiplier circuit and the output of the differential amplifier to first and second inputs, respectively, of the dividing circuits, and wherein the output of the dividing circuit constitutes said second terminal.

8. Apparatus as claimed in claim 7 wherein said circuit means further comprises means directly connecting said first and second terminals to said switching means.

9. Apparatus as claimed in claim 7 wherein said circuit means further comprises, a second multiplier circuit having an output that constitutes said first terminal, a second dividing circuit with its output coupled to one input of the second multiplier circuit, means for coupling the third terminal to the other input of the second multiplier circuit, fourth and fifth terminals for a second auxiliary voltage and a duty cycle control voltage, respectively, and means for coupling said fourth and fifth terminals to first and second inputs, respectively, of the second dividing circuit.

10. Apparatus as claimed in claim 9 wherein said circuit means further comprises a third multiplier circuit having an output that constitutes said third terminal, sixth and seventh terminals for a frequency control voltage and a threshold control voltage that defines said voltage range, respectively, and means for coupling said sixth and seventh terminals to first and second inputs, respectively, of the third multiplier circuit whereby the threshold control voltage controls the amplitude of the triangular waveform voltage independently of the repetition frequency or the duty cycle and the frequency control voltage controls the repetition frequency of the triangular waveform voltage independently of the amplitude or the duty cycle and the duty cycle control voltage controls the duty cycle of the triangular waveform voltage independently of the amplitude or the repetition frequency.

* * * * *

PO-1050
(5/69)

UNITED STATES PATENT OFFICE
CERTIFICATE OF CORRECTION

Patent No. 3,859,603 Dated January 7, 1975

Inventor(s) KARL HEINZ HERZNER

It is certified that error appears in the above-identified patent and that said Letters Patent are hereby corrected as shown below:

IN THE CLAIMS col. 6, line 6, after "applied" insert -- and --;

line 54, change "circuits" to -- circuit --;

Signed and Sealed this

*sixth* Day of *January 1976*

[SEAL]

*Attest:*

RUTH C. MASON
*Attesting Officer*

C. MARSHALL DANN
*Commissioner of Patents and Trademarks*